(12) United States Patent
Zhou

(10) Patent No.: US 11,818,095 B2
(45) Date of Patent: Nov. 14, 2023

(54) SYSTEM AND METHOD FOR FACILITATING DISTRIBUTION OF LIMITED RESOURCES USING A DROPZONE

(71) Applicant: Identity Digital Limited, Dublin (IE)

(72) Inventor: Hui Zhou, Toronto (CA)

(73) Assignee: IDENTITY DIGITAL LIMITED, Dublin (IE)

(*) Notice: Subject to any disclaimer, the term of this patent is extended or adjusted under 35 U.S.C. 154(b) by 100 days.

(21) Appl. No.: 17/469,554

(22) Filed: Sep. 8, 2021

(65) Prior Publication Data

US 2022/0086119 A1    Mar. 17, 2022

Related U.S. Application Data

(63) Continuation-in-part of application No. 17/324,895, filed on May 19, 2021, now abandoned, which is a
(Continued)

(51) Int. Cl.
*H04L 61/58* (2022.01)
*H04L 61/3015* (2022.01)
(Continued)

(52) U.S. Cl.
CPC .......... *H04L 61/58* (2022.05); *H04L 61/3025* (2013.01); *H04L 61/4511* (2022.05);
(Continued)

(58) Field of Classification Search
CPC ... H04L 61/58; H04L 61/3025; H04L 67/568; H04L 61/4511; H04L 67/5682;
(Continued)

(56) References Cited

U.S. PATENT DOCUMENTS

| | | |
|---|---|---|
| 11,044,225 B1 | 6/2021 | Zhou et al. |
| 2013/0179575 A1 | 7/2013 | Young et al. |

(Continued)

FOREIGN PATENT DOCUMENTS

| | | |
|---|---|---|
| EP | 3209002 A1 | 2/2017 |
| EP | 3407573 A1 | 5/2018 |
| WO | WO 2011/008705 A1 | 1/2011 |

OTHER PUBLICATIONS

U.S. Appl. No. 17/324,895, filed May 19, 2021, Zhou, et al.
(Continued)

*Primary Examiner* — Kyung H Shin
(74) *Attorney, Agent, or Firm* — Haynes and Boone, LLP

(57) ABSTRACT

A server for distributing a domain name to one of a plurality of registrars using a drop zone session implemented via a communications network, by establishing a set of drop zone windows having a first window and a second window, a defined start time of the second window being subsequent to a defined end time of the first window, the first window having a first set of acquisition parameters and the second window having a second set of acquisition parameters, such that the first set of acquisition parameters are different from the second set of acquisition parameters. Also provided is a shared server for distributing a domain name to one of a plurality of registrars using a drop zone session, the shared server having: a first network endpoint connected to a communications network, the first network endpoint having a first connectivity policy: a second network endpoint connected to the communications network, the second network endpoint having a second connectivity policy, such that the first connectivity policy is different from the second connectivity policy.

19 Claims, 9 Drawing Sheets

Related U.S. Application Data continuation of application No. 17/015,891, filed on Sep. 9, 2020, now Pat. No. 11,044,225.

(51) Int. Cl.
  *H04L 61/4511* (2022.01)
  *H04L 67/568* (2022.01)
  *H04L 67/5682* (2022.01)

(52) U.S. Cl.
  CPC .......... *H04L 61/302* (2013.01); *H04L 67/568* (2022.05); *H04L 67/5682* (2022.05)

(58) Field of Classification Search
  CPC .............. H04L 61/302; G06Q 30/0625; G06Q 30/0611; G06Q 30/0283
  See application file for complete search history.

(56) References Cited

U.S. PATENT DOCUMENTS

2017/0186061 A1* 6/2017 Minardos .............. H04L 61/302
2018/0287991 A1* 10/2018 Chawat .................. H04L 61/58

OTHER PUBLICATIONS

AnonymousL ""Dutch auction—Wikipedia"", Aug. 25, 2020 (Aug. 25, 2020), pp. 1-4, XP055879964 retrieved from the Internet: URL:https://en.wikipedia.org/w/index.php?title=Dutch_auction&oldid=974922880 [retrieved on Jan. 17, 2022].

* cited by examiner

SYSTEM AND METHOD FOR FACILITATING DISTRIBUTION OF LIMITED RESOURCES USING A DROPZONE

The present invention relates generally to the distribution of limited resources, and specifically to a server and method for facilitating the distribution of such resources.

BACKGROUND

A domain name is a name that can be entered into a computing device in order to access a web-site, for example. The domain name is looked up in a global Domain Name System (DNS) which informs the computing device of the Internet Protocol (IP) address for that domain name. The computing device can then access the web-site by contacting a server at the received IP address.

Although assigned to a "domain holder" or "registrant", domain names are controlled by domain name registries. Typically registration of a domain name is described as follows. Each registry is assigned one or more top-level domains, such as .info, .org, and the like. Most domain registries implement a registry-registrar model for registering the domain names. In this model, the registry only has to manage its relationship with the registrars. In turn, each registrar maintains its relationship with the registrants.

The registrant purchases a domain name from the registrar. The registrar registers the purchase with the registry. The registry updates the DNS to reflect the IP address of the registrant for the purchased domain name. In order to maintain rights to use the domain names, the registrant pays a renewal fee before an annual expiration date.

If the registrant does not renew the domain name by the expiration date, the domain name becomes expired. A grace period is often provided by the registrar before sending a delete request to the registry.

After the grace period, the registrar requests deletion of the domain name from the registry. Upon request of the deletion, the domain name enters a redemption grace period. The redemption grace period, typically 30 days, allows the registrar (and registrant) to restore the domain name from a pending deletion status and further allows them to renew the domain name. However, during this period all Internet services associated the domain name are disabled.

Due to the proliferation of the Internet, domain names can be extremely valuable marketing tools. Specifically, domain names that are intuitive can be very useful for a person or company wishing to make information available to the general public. This is a concept that is well known in the art and has led to practices such as domain name speculation.

Accordingly, when a previously used, but desirable domain name becomes available, registrants and, more typically, registrars that are involved in domain name speculation have a great incentive to apply a heavy load on the corresponding registry. Specifically, since domain names are awarded on a first-come, first-served basis, a speculator with the fastest access to the registry, or most number of connections that access the registry, stands the best chance of being the first to register a previously used domain name.

It is desirable for registries to provide relatively equivalent or equal access to previously used or new domain names that does not favour either large or incumbent registrars in the industry. However, using the first-come, first served model described above rewards registrars with the most powerful equipment or the most number of connections into the registry via multiple proxy registrars. Accordingly, this has resulted in an escalating "arms" race, with competing registrars applying constantly increasing loads against the registry, thereby threatening the ongoing performance and stability of the registry.

For example, the load generated on the registry when registrars attempt to acquire a previously used domain name via the current process is many times greater than that generated during regular registry operations. Therefore, the registry has to be maintained to accommodate a peak bandwidth that is significantly greater than it would typically require for normal operation. Continuing to increase resources at the registry to address this small percentage of competing registrars is an inadequate solution as it provides a continuously escalating additional cost to the registry.

Further, the current process limits fair and equivalent access to the list of previously used domain names being deleted by the registry on a daily basis, as smaller registrars are less likely to have the resources to compete with larger registrars. For example, it is recognised that confusion can arise when a domain name is deleted by a registrar, in particular near to the creation date of the domain name. The nearness in time between the delete event with respect to an Add Grace Period can be problematic, in determining an appropriate entry into a deletion process as is known in the art.

Further, it is recognised that incentives can be useful in directing domain name registration traffic, i.e. the acquisition of a domain name by an applicant, away from the main registry server and database, thereby facilitating domain name registrations while at the same time helping bandwidth allocation for other registry services (e.g. domain modify, delete, etc.).

SUMMARY

Accordingly, it is an advantage of the present invention to provide a mechanism for acquiring domain names that obviates or mitigates at least some of the problems described above.

A first aspect provided is a server for distributing a domain name to one of a plurality of registrars using a drop zone session implemented via a communications network, the server having stored instructions for execution by a computer processor for: establishing a set of drop zone windows having a first window and a second window, a defined start time of the second window being subsequent to a defined end time of the first window, the first window having a first set of acquisition parameters and the second window having a second set of acquisition parameters, such that the first set of acquisition parameters are different from the second set of acquisition parameters; assigning the domain name to the first window with the associated first set of acquisition parameters; determining the domain name remains unacquired upon reaching the end time of the first window; assigning the domain name to the second window with the associated second set of acquisition parameters; receiving a registration request via the communications network from a registrar for the domain name before a defined end time of the second window; processing the registration request using the second set of acquisition parameters; and registering the domain name in a registry database as acquired by the registrar.

A second aspect provided is a shared server for distributing a domain name to one of a plurality of registrars using a drop zone session, the shared server having: a first network endpoint connected to a communications network, the first network endpoint having a first connectivity policy: a second network endpoint connected to the communications network, the second network endpoint having a second connectivity policy, such that the first connectivity policy is different from the second connectivity policy: a computer processor and memory shared for processing requests received on any of the first network endpoint and the second network endpoint, the memory having stored instructions for execution by the computer processor for: using the second network endpoint to receive registration requests associated with a drop zone session; and using the first network endpoint to receive one or more registry requests other than said registration requests; wherein any of said registration requests received on the first network endpoint are configured for refusal by the shared server.

BRIEF DESCRIPTION OF THE DRAWINGS

Embodiments of the present invention will now be described by way of example only with reference to the following drawings in which:

FIG. 1b is block diagram of a representative publication for the drop zone infrastructure of FIG. 1a;

FIG. 8 is an alternative embodiment of the system of FIG. 1a.

DETAILED DESCRIPTION OF THE PREFERRED EMBODIMENTS

Figure 1A:
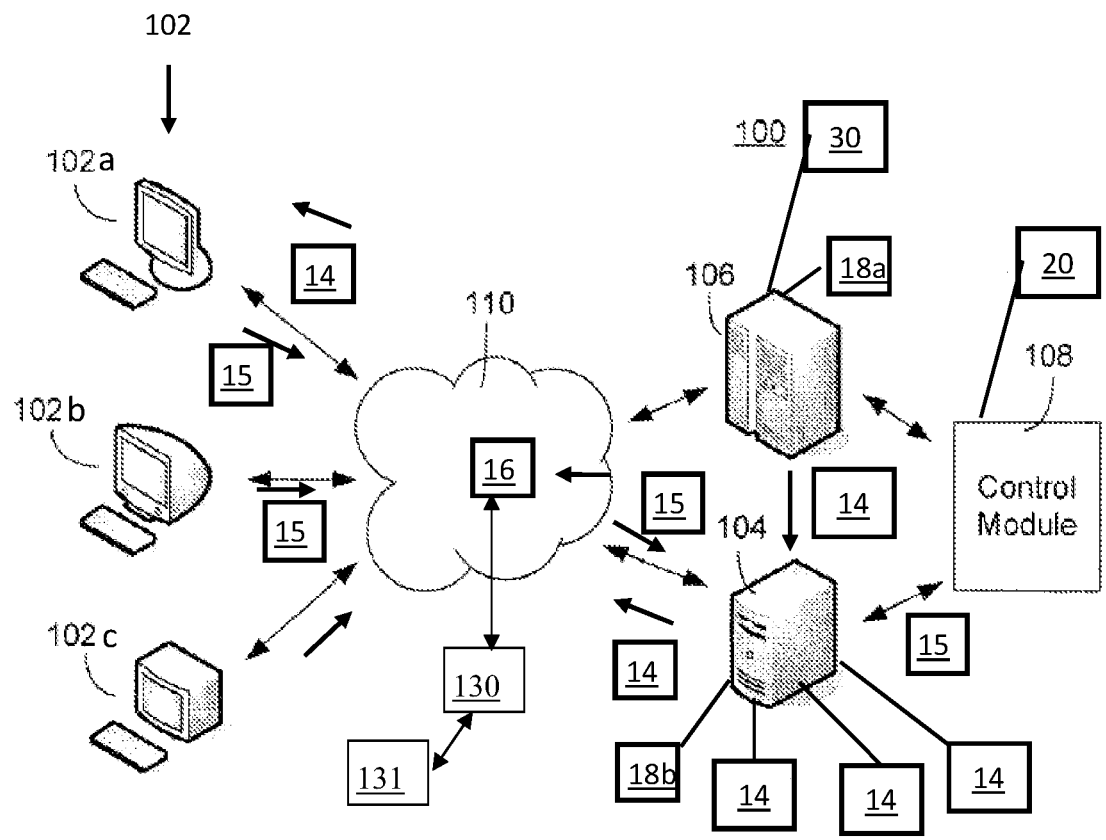
FIG. 1a is block diagram of a drop zone infrastructure.

For convenience, like numerals in the description refer to like structures in the drawings. Referring to FIG. 1a, a drop zone infrastructure/system is illustrated generally by numeral 100. The drop zone infrastructure 100 includes one or more registrars 102, one or more drop zone servers 104, one or more main registry servers 106, and a drop zone control module 108. Using the drop zone infrastructure 100, the plurality of registrars 102a,b,c each send in a registration request 15 (e.g. Domain Create) for a domain name 14 made available via the drop zone server 104. As such, when those domain name(s) 14 become available for acquisition (e.g. purchase) by a registrar 102 (via their respective registration request 15), the main registry server 106 (e.g. in conjunction with the control module 106) facilitates availability of the specific domain name(s) 14 to the drop zone server 104 by publishing 16 their availability for acquisition, as further described below. Once reported available via the publication 16, the drop zone server 104 can manage the acquisition of a particular domain name 14 by one of the registrars 102a,b,c, upon receipt of typically multiple registration requests 15 for that same domain name 14, giving the timing of the availability of the domain name 14 for acquisition as provided for in the publication 16. As such, only one of the registrars 102a,b,c would ultimately be able to request 15 and successfully acquire (e.g. register) the domain name 14, recognising that multiple registrars 102a,b,c can compete and each request in parallel for the domain name 14 when available from the drop zone server 104.

The publication 16 can contain details 131 of the domain names 14 available for registration when a drop zone period or window 130 opens. For example, a window 130 can have a defined start time (e.g. Oct. 13, 2021 at 9:00 AM) and a defined end time (e.g. Oct. 15, 2021 at 9:00 AM). Further, the details 131 can specify which domain names 14 are included in the specified window 130 (e.g. which domain names 14 are available for registration by a registrar 120a,b,c between the start and end times). Further, the details 131 can specify what type the domain names 14 are (e.g. regular, premium, etc.), as well as pricing (or other acquisition rules) for the domain name(s) 14 acquired in that particular window 130 for a published drop zone process as specified in a publication 16.

Figure 1B:
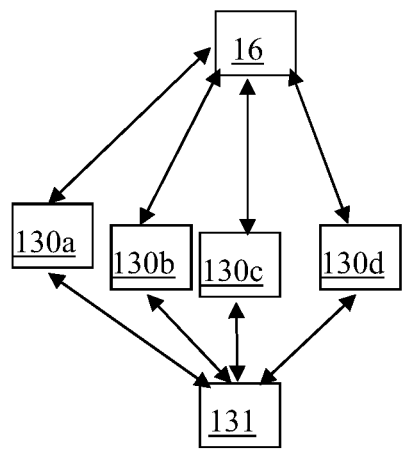

Referring to FIG. 1b, shown is a representative block diagram of the publication 16, having a plurality of windows 130a, 130b, 130c, 130d. Each of the windows 130a,b,c,d can have window details 131 associated therewith (e.g. pricing, start/end time, specified domain names, specified domain name types, specified renewal period, etc.). For example, the end time for a current window (e.g. window 130a) can be the same as the start time for the subsequent window (e.g. 130b). Alternatively, the end time for a current window (e.g. window 130a) can be earlier than the start time of the subsequent window (e.g. 130b), as desired. In any event, it is recognised that for the case of a plurality of windows 130a,b,c,d, only one window 130 at a time would be operational (i.e. would be used by the drop zone server 104 to coordinate purchasing of the domain names 14 listed in the publication 16, following the details 131 (e.g. registration rules) associated with the particular current window 130).

Figure 1C:
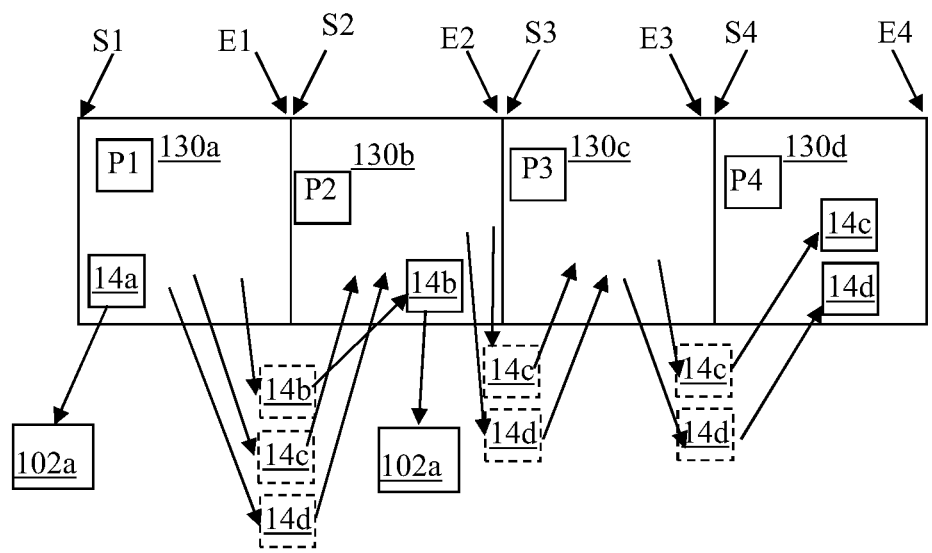
FIG. 1c is block diagram of an example set of windows as implemented via the publication of the drop zone infrastructure of FIG. 1b.

Referring to FIG. 1c, it is recognised that each window 130a,b,c,d can have different acquisition details 131 associated therewith. For example, the first window 130a can have a first acquisition value P1 (e.g. purchase price) higher than a second acquisition value P2 (e.g. price) of the second window 130b, second window 130a can have the second acquisition value P2 (e.g. purchase price) higher than a third acquisition value P3 (e.g. price) of the third window 130c and the third window 130c can have the third acquisition value P3 (e.g. purchase price) higher than a fourth acquisition value P4 (e.g. price) of the fourth window 130d. Further, as shown by example, each window 130a,b,c,d has an associated start time S1, S2, S3, S4 and an associated end time E1, E2, E3, E4.

FIG. 1c also portrays pictorially, by example, the acquisition process for a selected domain name 14a,b,c,d. As shown, domain 14a is acquired/registered in the first window 130a (i.e. before reaching the end time E1), following the acquisition details 131 (e.g. P1) associated therewith. Domain names 14b,c,d were not acquired when the first window closed (i.e. the end time E1 was reached) and therefore are transferred into the second window 130b and therefore are subject to the acquisition details 131 (e.g. P2) associated therewith. Domain 14b is acquired during the second window 130b and domain names 14c,d remain unregistered and thus are transferred into the third window 130c, and therefore are subject to the acquisition details 131 (e.g. P3) associated therewith. Further, since the domain names 14c,d remain unregistered upon reaching the third end time E3, they are thus transferred into the fourth window 130*d*, and therefore are subject to the acquisition details 131 (e.g. P4) associated therewith. By example, the ghosted lines represent the domain names 14*a, b, c, d* in a state of transfer and the solid lines represent their ultimate destination. In the example where the acquisition details P1, P2, P3, P4 represent purchase price, price P1 is higher than price P2 which is higher than price P3 which is higher than price P4. Accordingly, the lowering of the acquisition values (e.g. prices) P1, P2, P3, P4 is advantageous, as it promotes use of the drop zone server 104 and its associated windows 130, as those registrars 102 having the ability to purchase the domain name 14 at a higher price will also get preferential access to purchase the domain, i.e. the registrar 102 will have the opportunity to purchase the domain at a higher price in a current window 130 (and thus have less competition from other registrars 102), before the domain name 14 drops our of the current window 130 and into the subsequent window 130.

As such, it is recognised that each of the domains 14 is associated with a schedule of acquisition details/parameters 131, such that one or more of the parameters 131 (e.g. P1, 2, 3, 4) change (e.g. have a different relative value) when the domain name(s) are moved from the current window 130 to the subsequent window 130. Ideally, the parameters 131 are specified as being more advantageous in the earlier windows as compared to the later windows 130. For example, representing price, P1 can be higher than P2 which can be higher than P3 which can be higher than P4. For example, representing an ownership term of the domain name (e.g. the renewal period), P1 can be higher than P2 which can be higher than P3 which can be higher than P4—for example P1 represents a renewal period of 3 years while P4 represents a renewal period of 1 year. It is also recognised that one or more of the parameters 131 can incrementally/relatively increase (rather than decrease) from the current window to the subsequent window 130, as desired.

Further to the above, it is also recognised that some of the windows 130 (in a multi window 130 framework) could also have specified parameters 131 that are not associated/shared with one or more of the other windows 130. In one example, a selected domain name 14 would have a baseline price PB (e.g. price P4), such that each of the other parameters P1, P2, P3 would represent different premium values added to the baseline price P4 (premium value P1 is higher than premium value P2 which is higher than premium value P3, such that purchase price would be P4+P1 or P4+P2, etc.), recognizing that window 130*d* may not have a premium value parameter 131 associated therewith. Further, it is recognised that the details 131 can specify that the baseline price P4 is refundable (e.g. when using the grace period process as provided below by example) while one or more of the premium prices P1, P2, P3 would not refundable (e.g. in the event that the registered domain name is returned by the registrar 102—such as by using a delete command within one or more of the applicable grace periods). As such, some of the windows 130 may have a rebate parameter 131 associated therewith while other window(s) 130 may not.

Further to the above, once the domain name 14 reaches the end of the windows 130, e.g. end time E4 of window 130*d*, the available registration of domain name 14 can be transferred out of the control the drop zone server 104 and back to the main registry server 102. In other words, once the domain name 14 remains non-acquired (by a particular registrar 102) and reaches the final end time (e.g. E4), the registration process of the unregistered domain name 14 can be transferred back to the coordination/control of the main registry server 102. It is also recognised that the last window 130*d* can be hosted by the drop zone server 104 or can be hosted by the main registry server 102 itself, recognizing that hosting a particular window 130 means that the host server (e.g. 102 or 104) of the window 130 is the network entity communicating over the network 110 with the registrar 102 during the registration process of the domain name 14 (e.g. the host server receives the registration request 15 (i.e. create command) sent from the registrar 102 to the host server over the network 11). As demonstrated, once the main registry server 102 regains control do the acquisition process of the domain name 14, then the domain name 14 is considered outside of the drop zone process as was detailed in the associated publication 16 (published prior to the start time of the set of windows 130 listed in the publication 16).

Further, for example, the drop zone module 108 (e.g. hosted by the main registry server 106, the drop zone server 104 and/or a separate server—not shown) can be used by the system 100 to coordinate the generation of the publication 16, including the listing of the specified domain names 14, their corresponding windows 130 and associated details 131. As such, the generated publication 16 can be sent to (or otherwise received by) the drop zone server 104 (or the main registry server 102 in the case of the domain name remaining unregistered during the operation of the drop zone session) as a set of rules with which to coordinate the domain name registration process, as implemented during the defined window(s) 130. Further, in one embodiment, the control module 108 can be used to collect new registration information (e.g. which registrar 102 successfully acquired).

As shown by example in FIG. 1, registrars 102*a,b,c* each request 15 the domain name 14 from the drop zone server 104, however only registrar 102*a* successfully obtains the domain name 14 in response to the registrar's 102*a* request 15 (e.g. decided on by a first come first serve basis). In general, the drop zone server 104 has available at any one time a plurality of domain names 14, as specified in the publication 16, such that each of the available domain names 14 would be awarded to one of the plurality of registrars 102*a,b,c* by processing a respective registration request 15 of that successful registrar 102. The publication 16 can be provided by the main registry server 106, the drop zone server 104 and/or the control module 108, as desired.

The registrars 102 are in communication with both the drop zone server 104 and the main registry server 106 via a communication network 110. As will be appreciated, the communication network 110 may be a wide-area network (WAN), such as the Internet, or a local-area network (LAN). For example, the publication 16 would also be provided to the registrars 102 via the communication network 110.

The drop zone server 104 is in communication with the drop zone control module 108, which is in communication with the main registry servers 106. Although the drop zone control module 108 is illustrated as a separate device, it will be appreciated that it can be incorporated as part of either the drop zone server 104 or the main registry server 106. Further, the registrars 102 have a corresponding account set up with either the drop zone server 104 or main registry server 106, or both, to facilitate payment of services used to acquire ownership (and associated maintenance) of one or more domain names made available to the registrar(s) 102 via the drop zone server 104. Different configurations of the drop zone infrastructure 100 will become apparent to a person of ordinary skill in the art.

Effectively, the drop zone server 104 provides a limited registry system. Accordingly, the drop zone server supports a limited number of commands. In the present embodiment, the drop zone server 104 supports three primary commands (e.g. using an EPP protocol): Login; Domain Create; and Extensible Provisioning Protocol (EPP) Hello. EPP provides a standard Internet domain name registration protocol for use between the registrars 102 and the main registry server 106. EPP is well known in the art and need not be described in detail. The Login command is used by the registrars 102 to access the drop zone server 104. Domain Create is used to request a domain name. EPP Hello is used to verify connectivity by the registrars 102 to the drop zone servers 104.

The drop zone control module 108 controls the distribution of requested domain names 14 in accordance with available domain names 14 and registration requests 15 submitted to the drop zone servers 104, as will be described. Accordingly, it will be appreciated that the main registry servers 106 can be used primarily for tasks such as maintaining the DNS registry and servicing DNS resolution queries. Connectivity to the drop zone server 104 can be highly limited and equivalent between registrars 102. For example, each registrar 102 can be limited to three connections to the drop zone server 104. This affords scalability and the ability to maintain separate connectivity policy 18a for the drop zone server 104 and connectivity policy 18b for the main registry server 106. The connectivity policy 18a can be used to define the number of connections allowed at one time between a particular registrar 102 and the respective server 106. Accordingly, an excess number of connection requests from a particular registrar 102 would be inhibited (e.g. not allowed) by the main server 106, thus any such excess connection requests received by the main server 106 would not be processed (e.g. an error message would be returned to the registrar 102 upon receipt by the main server 106 of such a restricted excess connection—e.g. number of connections with a particular registrar 102 greater than a defined number). The connectivity policy 18a can be used to define the type of network 110 communication/command/request allowed between a particular registrar 102 and the respective server 106, e.g. set up an account with the main registry server 106, and other EPP commands such as Delete domain, Renew domain, etc. The connectivity policy 18a could also restrict (e.g. not allow) command types such as Domain Create pertaining to purchase of the domain names 14 made available via the publication 16. Accordingly, for example such as Domain Create, this command would be inhibited (e.g. not allowed) to be submitted from the registrars 102 to the main server 106, thus any such restricted commands received by the main server 106 would not be processed (e.g. an error message would be returned to the registrar 102 upon receipt by the main server 106 of such a restricted command type).

The connectivity policy 18b can be used to define the number of connections allowed at one time between a particular registrar 102 and the respective server 104, such that the number of connections for the server 104 can be different from the number of connections for the server 106. The connectivity policy 18b can be used to limit the type of network 110 communication allowed between a particular registrar 102 and the respective server 104, e.g. EPP commands such as Domain Create, Hello, and Login pertaining to purchase of the domain names 14 made available via the publication 16. Accordingly, other commands, such as Delete Domain, would be inhibited (e.g. not allowed) to be submitted from the registrars 102 to the drop zone server 104, thus any such restricted commands received by the drop zone server 104 would not be processed (e.g. an error message would be returned to the registrar 102 upon receipt by the drop zone server 104 of such a restricted command type).

Figure 5:
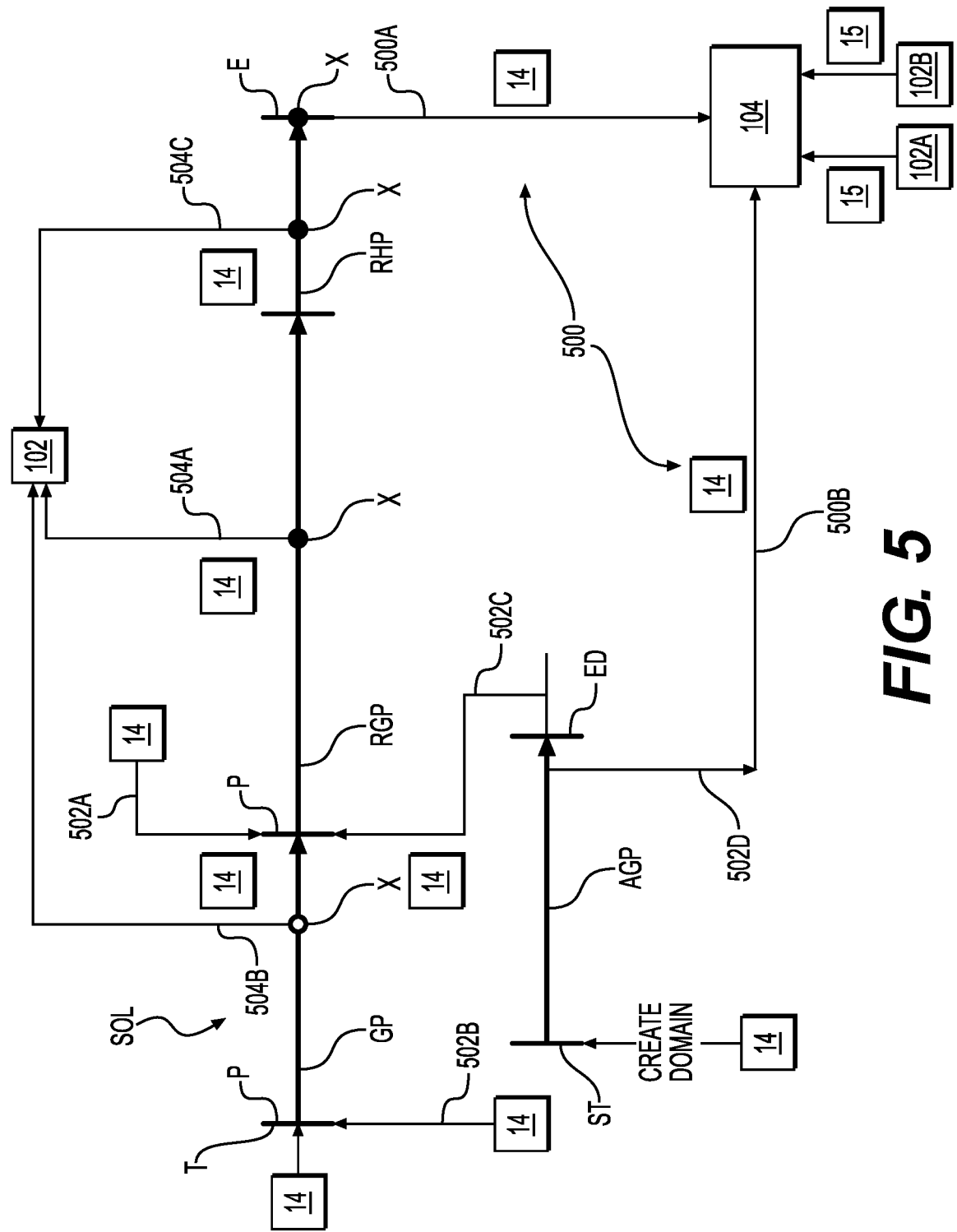
FIG. 5 is diagram of various periods relating to different Delete processes for a domain name of the system of FIG. 1.

Further, it can be seen that the drop zone server 104 provides a segregated system from the main registry server 106 for managing a synchronized full release of previously used domain names 14 that have reached the end of their redemption hold periods (RHP—see FIG. 5, as part of the delete queue 501). Registrars 102 will be less likely and will have less incentive to maintain a high number of connections to the main registry server 106 for catching a domain name 14 when previously used domain names 14 are released, or dropped via the drop zone server 104. In general, it is recognised that the delete queue 501 can have any number of periods contained therein, as by example only a Grace Period GP, a Redemption Grace period RGP and a redemption Hold Period RHP. In any event, it is recognised that a domain name 14 can enter the delete queue 501 at any point, as configured, e.g. in response to a delete command 502a,b,c as further described below, and can leave the delete queue 501 either by being released to the drop zone server 104 (e.g. via drop zone server entry point 500a) or being reclaimed by the registrar 102 (e.g. by request 504a,b,c), as desired. It is recognised that the delete queue 501 can have more, less, or different periods GP, RGP, RHP as described by example. What is important, is whether the domain name 14 enters the queue 501 (e.g. in response to a delete command 502a,b,c) or otherwise bypasses the delete queue 501 (e.g. in response to a delete command 502d) and therefore uses one of two available drop zone server entry points 500a,b. The determination of which entry point 500a,b to can be based on whether the domain name 14 is within or outside of aa Add Grace Period AGP, as further described below.

Figure 2:
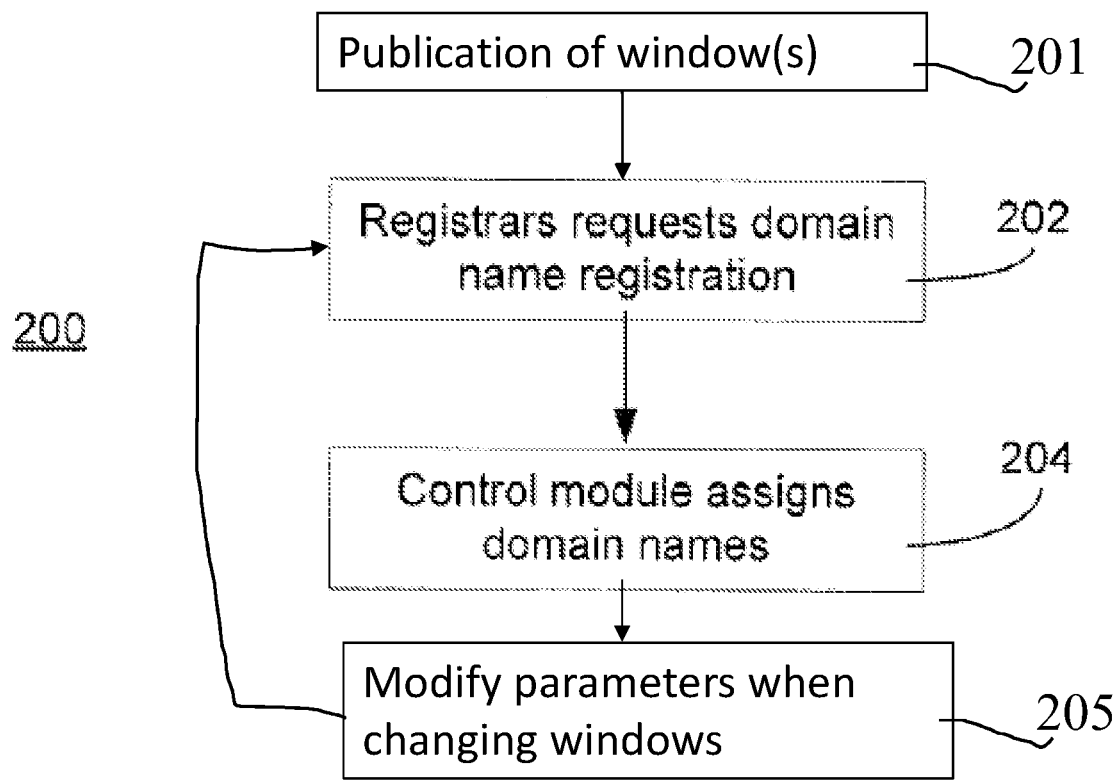
FIG. 2 is a flow chart illustrating a registration process for previous used domain names that become available.

Referring to FIG. 2, a flow diagram illustrating a process for registering a domain name 14 using the drop zone infrastructure 100 is shown generally by numeral 200. In step 201, the publication 16 containing the details 131 about the window(s) 130 is distributed to the registrars 10 over the communications network 110. In step 202 the registrars 102 submit registration requests 15 to the drop zone server 104 for previously used domain names 14 available for registration within the current window 130. In step 204, the drop zone control module 106 parses the registration requests 15 received by the domain name server 104 and assigns the previously used domain names 14 accordingly based on one or more criteria 20 (e.g. on a first come first serve basis, based on the availability of deposit account funds with the main registry server 106, registrar 102 being eligible to participate in purchasing of the requested domain name 14, etc.). Both of these steps 202 and 204 are described in greater detail with reference to FIGS. 3 and 4. In the case of multiple windows 130, if the domain name 14 remains unregistered at the end time of the current window 130, then the acquisition parameters 131 associated with that domain name 14 are modified 205 according to the parameter schedule contained in the details 131 (e.g. the parameter values P1, P2, P3, P4 are updated to reflect in which window 130 the particular domain name 14 currently resides).

Figure 3:
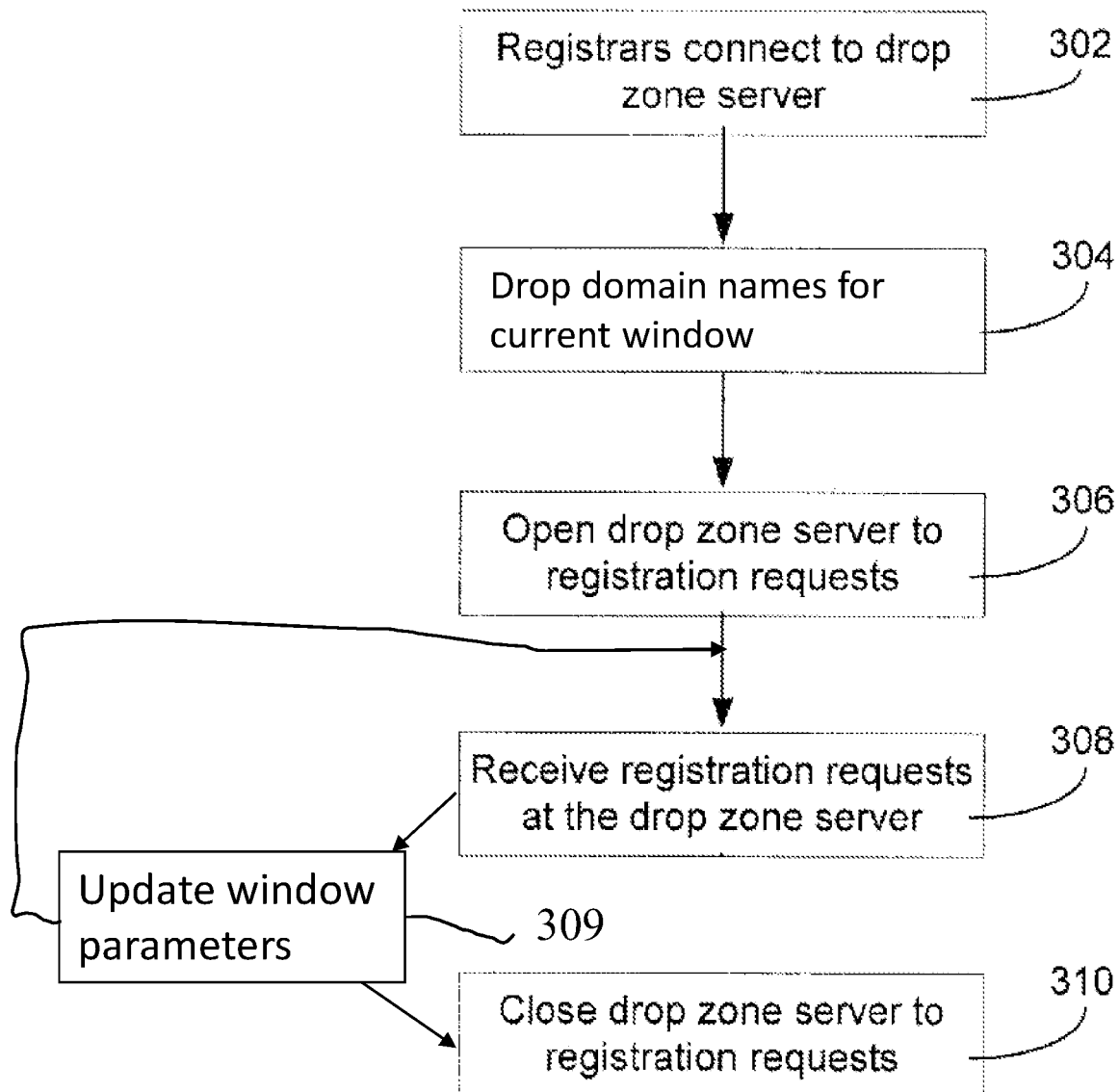
FIG. 3 is a flow chart illustrating the registration request process of FIG. 2 in greater detail.

Referring to FIG. 3, a flow diagram illustrates the step 202 of requesting registration of a previously used domain name 14 in greater detail. In step 302, the registrars 102 connect with the drop zone server 104. The registrars 102 are initially able to test their connectivity to the drop zone server 104 using the EPP Hello command. However, an attempt to register a previously used domain name 14 at this point, using the Domain Create command, could result in an error.

In step 304, a plurality of previously used domain names 14 for which the redemption hold period RHP is expiring that day (or are otherwise made available as new domain names via the publication 16) is made accessible for registration simultaneously to all registrars 102. In the present embodiment, the term day refers to a calendar day, although it will be appreciated that it can be any predefined time period. Further, by example where a grace period system is employed—see FIG. 5, previously owned domain names 14 can be defined as those reaching (expected to reach) the end point E of the delete queue 501 (e.g. redemption hold period RHP). In any event, any domain name(s) 14 that are considered to be expiring (e.g. that day) by a cut-off time for an upcoming drop zone session (as implemented by the drop zone server 104 in cooperation with the main registry server 106 and registrars 102) are made accessible (e.g. via advance notice facilitated by the publication 16). As discussed, also new domain names (e.g. previously unregistered domain names 14) can be included in the publication 16, as desired.

In step 306, at a predefined time (e.g. as defined in the publication 16 for the current window 130) that allows the registrars 102 to have established a connection (via the published drop zone session and available domain name(s) 14 thereby) with the drop zone server 104, a change is made to the status of the drop zone server 104 and it is opened for domain name 14 registration (e.g. for those domain names 14 listed in the publication 16 as being made available in the defined/specified window 130 of the drop zone session in the publication 16). Once the drop zone server 104 opens, the registrars 102 can submit registration requests 15 for desired domain names 14 as listed/included in the respective publication 16 for the current window 130. The registrars 102 may only register for domain names 14 (new, previously registered, etc.) listed for release that day as per the publication 16. This information (e.g. details 131) is made available to each of the registrars 102 by a (e.g. daily) published domain reports/publications 16, provided to all registrars 102 (e.g. via the communications network 110).

At step 308, the drop zone server 104 records the received registration requests 15 and maintains them in the order in which they are received, for example, as defined in the criteria 20. As will be appreciated by a person skilled in the art, this can be achieved in a number of different ways. For example, the registration requests 15 may be maintained in a first-in-first-out (FIFO) queue. Alternatively, the time the registration request 15 is received is stored along with the registration request 15. In this example, the resolution of the time is sufficient to distinguish between consecutive registration requests 15. Accordingly, since the order of the registration requests 15 is maintained, the drop zone server 104 can accept duplicate registration requests 15.

In the present embodiment, it is the responsibility of the registrar 102 to provide that the registration request 15 is for an available domain name 14, as listed in the respective publication 16. If the registrar 102 submits an incorrect registration request 15, for example, for a domain name 14 not in the published report 16, the request 15 results in an error and is not processed by the drop zone control module 108. Optionally, the registrar 102 is advised of the error via an error message from the drop zone server 104.

In step 309, after the current window 130 expires, any remaining unregistered domain names 14 are moved to the subsequent window 130 and their acquisition parameters 131 are updated based on details 131 (for the now new current window) associated with the publication 16.

In step 310, after a predefined time (e.g. reaching end time E4) a change is made to the status of the drop zone server 104 and it is closed to domain name 14 registrations for that day/period (e.g. set of window(s) 130 defined in the publication 16). As an example, the drop zone server 104 remains open for two hours. However, it will be appreciated that since all domain names 14 available for registration are released simultaneously, they will likely be spoken for within a short period of time (e.g. several minutes).

Figure 4:
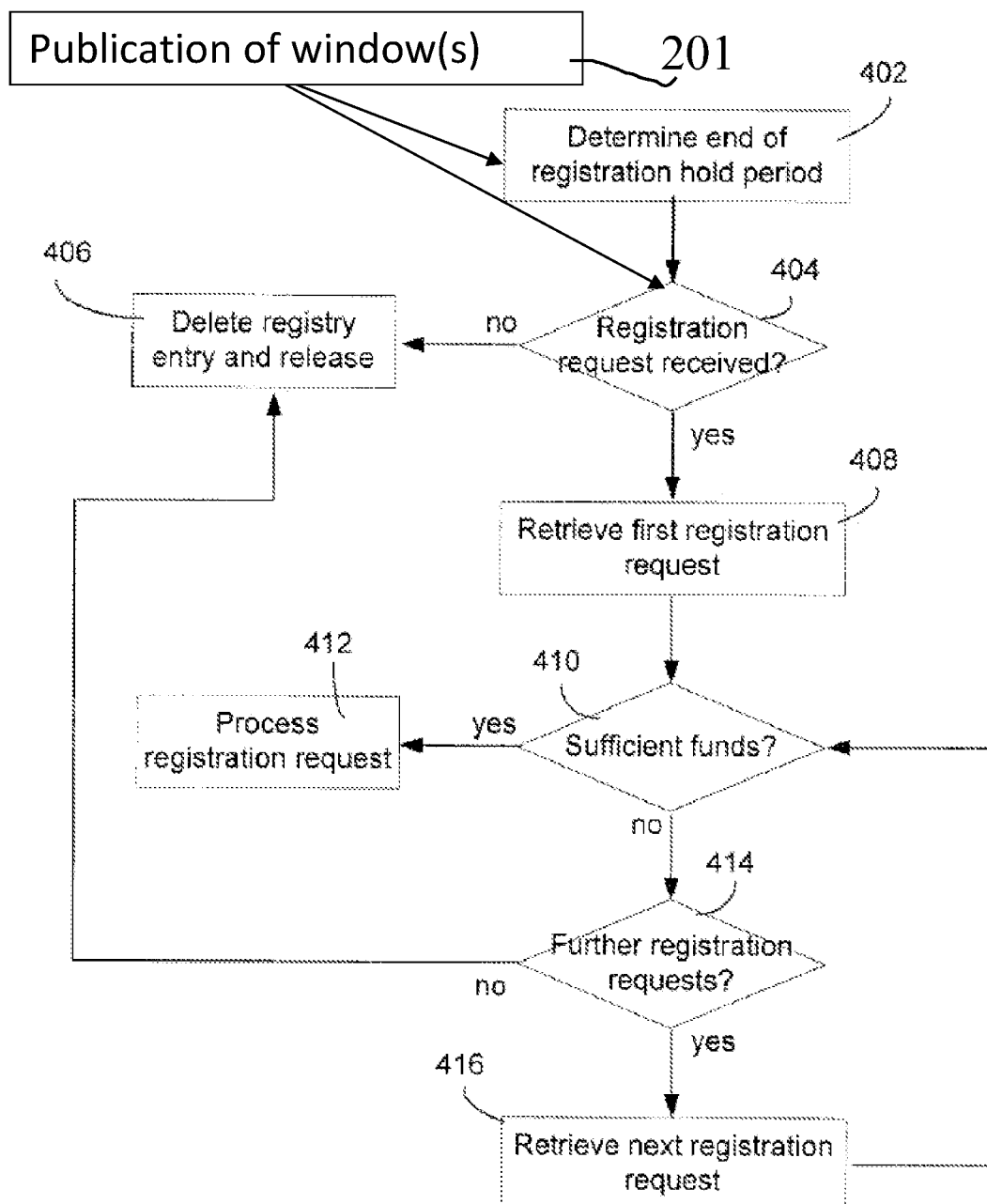
FIG. 4 is a flow chart illustrating the registration fulfillment process of FIG. 2 in greater detail.

Referring to FIG. 4, a flow diagram illustrates by example the step 204 of assigning a previously owned domain name 14 in greater detail, after the publication 16 has been sent out 201. However, it is recognised that FIG. 4 can also be applied in the case of new domain names 14 as well, such that step 402 would be moot. In optional step 402, the drop zone control module 108 determines which previously owned domain names 14 maintained by the main registry server 106 are eligible for inclusion in the publication 16 (e.g. completing their redemption hold period RHP or deleted during/within the Add Grace Period (AGP), etc.) that day. For example, optional step 402 can be referred to as the starting point of the process outlined in FIG. 4, also referred to as determine the domain name(s) 14 in the drop zone (e.g. held by the drop zone server 104).

In a further embodiment to the above implementation of the windows 130, referring to FIG. 5, where grace period processes are used in releasing the domain names 14 via the drop zone serer 104, shown are the example entry points 500 to the drop zone server 104 of the domain name(s) 14, which are made available from the main registry server 106, as further described below. It is recognised that Add Grace Period AGP can also apply to new domain names 14 (names that were not previously assigned to a registrar 102) that are acquired via the schedule of one or more window(s) 130.

Concerning general operation of the main registry server 102 and drop zone server 104, management of domain name 14 can be affected via EPP commands to transform domain objects (e.g. domain names 14), five principal ones being: <create> to create an instance of a domain object, <delete> to delete an instance of a domain object, <renew> to extend the validity period of a domain object, <transfer> to manage domain object sponsorship changes, and <update> to change information associated with a domain object.

For example, it is the <create> command that is contained in the registration request 15, as processed by the control module 108. In addition to the standard EPP command elements, the <create> command would/could contain a <domain:create> element that identifies the domain namespace 14. The <domain:create> element can contain the following child elements: a <domain:name> element that contains the fully qualified name of the domain object (e.g. name 14) to be created; an OPTIONAL <domain:period> element that contains the initial registration period of the domain object. A server may define a default initial registration period if not specified by the client; an OPTIONAL <domain:ns> element that contains the fully qualified names of the delegated host objects or host attributes (name servers) associated with the domain object to provide resolution services for the domain; an OPTIONAL <domain:registrant> element that contains the identifier for the human or organizational social information (contact) object to be associated with the domain object as the object registrant; zero or more OPTIONAL <domain:contact> elements that contain the identifiers for other contact objects to be associated with the domain object; and <domain:authInfo> element that contains authorization information to be associated with the domain object.

It is recognised that once the domain name 14 is obtained by the registrar 102 through the <create> command, e.g. as processed via the registration request 15, the registrar 102 would then be responsible for maintaining the acquired domain name 14 via the main registry server 106. For example, the registrar 102 (e.g. on behalf of the registrant of the domain name 14) could submit various EPP commands 22 to the main registry server 106, as provided for in the connection policy 18a. One of the commands that can be processed by the main registry server 106, for a specified domain name 14, is the Delete domain command.

This Delete domain command can be generated in a number of different ways. Referring to FIG. 5, shown is a delete queue 501 for facilitating transfer of a particular domain name 14 from the main registry server 106 to the drop zone server 104 (via the publication 16). The delete queue 501 is defined from a begin point T (e.g. the defined expiry date of the domain name 14) and an end point E (e.g. the end of the redemption hold period RHP). It is recognised that there can be one or more different entry points P (as facilitated by various delete commands 502a,b,c as further described below) for a domain name 14 to enter the delete queue 501. It is also recognised that there can be a number of exit points X (as facilitated by various remove requests 504a,b,c as further described below) for a domain name 14 to leave the delete queue 501 before the end point E (also referred to as an exit point X). Once the domain name 14 reaches the end point E of the delete queue 501, the domain name 14 is passed to the drop zone server 104 for subsequent purchase by the registrars 102, by drop zone entry point/path 500a. It is recognised that the anticipated reaching of the end point E (of the delete queue 501) by the domain name 14 would be added to the content of the publications 16 and their associated window(s) 130, and thus distributed to the registrars 102 in advance of opening the drop zone server 104 for purchase of the domain name 14 (see FIGS. 3,4). Once resident in the drop zone server 104, the domain name 14 would be subject to progressing through the plurality of windows 130 (see FIGS. 1b,1c) until the domain name 14 is acquired by a registrar 102.

One way to have the domain name 14 to enter the delete queue 501 is for the registrar 102 to submit an intermediate <delete> command 502a for a particular domain name 14 to the main registry server 106. This intermediate <delete> command 502a could be sent by the registrar 102 to the main registry server 106 after the domain name 14 has been registered by the registrar 102 (with the main registry server 106) but before the specified end of term (e.g. expiry date also referred to as entry point T) for the domain name 14 (e.g. the registrar 102 has decided to cease ownership of the domain name 14 prior to reaching the expiry/renewal date of the domain name 14). At this point, the domain name 14 would enter the delete queue 501 (e.g. into a redemption grace period (RGP)), for a defined period of time (e.g. 30 days). During this RGP, the registrar 102 could be able to submit a reverse request 504a of the previously submitted intermediate <delete> command 502a (i.e. the registrar 102 would indicate the desire to resume ownership of the domain name 14) and thus could resume maintenance of the domain name 14 with the main registry server 106 (e.g. by paying the required renewal fee, etc.). In this manner, the domain name 14 would be removed from the delete domain queue 501 and would be diverted from being passed to the drop zone sever 104 (e.g. would not be published in the publication 16). For example, by using the intermediate <delete> command 502a, the domain name 14 could skip a Grace Period (GP) portion of the delete queue 501, as desired.

Alternatively, the domain name 14 can enter the delete queue 501 by a generated expiry <delete> command 502b, e.g. by the main registry server 106, in the event that the registrar 102 fails to renew the domain name 14 at the defined end of term (e.g. domain expiry date), also referred to as T which can be the same as the start point of the delete queue 501). For example, there can be the grace period GP of the delete queue 501, optionally provided by the main registry server 106 to the registrar 102 before the domain name 14 ultimately enters the RGP period. Further, during this GP period, the registrar 102 could be able to submit a reverse request 504b of the expiry <delete> command 502b (i.e. the registrar 102 would indicate the desire to resume ownership of the domain name 14 and pay the renewal fee—e.g. by submitting the appropriate EPP command to the main registry server 106 for the domain name 14) and thus would resume maintenance of the domain name 14 with the main registry server 106. In this manner, the domain name 14 would be removed from the delete domain queue 501 and would be diverted from being passed to the drop zone sever 104 (e.g. would not be published in the publication 16).

Alternatively, the domain name 14 can enter (e.g. via the RGP) the delete queue 501 by submitting (to the main registry server 106) a post AGP <delete> command 502c (e.g. submitted by the registrar 102 to the main registry server 106) after the expiry of an Add Grace Period AGP. The AGP is a period of time, e.g. 5 days, which can be measured from when the domain name 14 is purchased (e.g. obtained by a domain create command—in the registration request 15—by the registrar 102 via the drop zone server 104). The manner of obtaining the domain name 14 by the registrar 102 from the drop zone server 104 is described by example in FIGS. 3,4. It is also recognised that the domain name 14 could have been acquired by the registrar 102 from the main registry server 106 by a process other than by the drop zone server 104 (e.g. in purchasing a new domain name 14 rather than a previously owned domain name 14). The AGP period is provided as a defined period of time (e.g. 5 days) post acquisition (e.g. purchase) of the domain name 14 by the registrar 102, thus having a start point ST and an point ED. However, if the registrar 102 decides to submit a pre AGP <delete> command 502d, i.e. before the expiry of the AGP period, then the domain name 14 bypasses the delete queue 501 and is diverted to the drop zone server 104 (as well as being included in the publication 16 for the respective upcoming drop zone session). As such, for any domain names 14 deleted by the registrar 102 (or otherwise) before the expiry of the AGP period, the domain name 14 is not eligible for inclusion in the delete queue 501 and is thus diverted to the drop zone server 104 for the next scheduled purchase period (as dictated by the publication 16).

Once the RGP period of the delete queue 501 is over for the domain name 14 (e.g. the domain name 14 was resident in the RGP period for 30 days), the domain name 14 can enter a Redemption Hold Period (RHP) of the delete queue 501. For example, the RHP can be a fixed period of time as specified by the main registry server 106 (e.g. 5 days). It is recognised that the RHP can be less than the RGP. It is recognised that the registrar 102 can request 504c from the main registry server 106 to resume ownership of the domain name 14 and thus remove the domain name 14 from the delete queue 501 before reaching the queue end E. It is recognised that the request 504c may take a form other than a straight forward EPP request.

In view of the above, once the domain name 14 reaches the end point E of the delete queue 501, the domain name is then passed to the drop zone server 104 for purchase by the registrars 102, via the submitted registration requests 15 (as decided upon by the control module 108).

Referring again to FIG. 5, the delete commands 502*a,b,c,d* can be in the form of a <delete> command according to a command protocol, e.g. EPP. For example, the EPP <delete> command provides a transform operation that allows a client to delete a domain object (e.g. the domain name 14). In addition to the standard EPP command elements, the <delete> command would contain a <domain: delete> element that identifies the domain namespace (i.e. name 14). The <domain:delete> element contains the following child elements: a <domain:name> element that contains the fully qualified name 14 of the domain object to be deleted.

Referring again to FIG. 4, at step 404, if the domain name 14 reaches the end of the delete queue 501 (e.g. redemption hold period RHP), the domain name 14 is considered as expired. The drop zone control module 108 determines if a corresponding registration request 15 was submitted to the drop zone server 104. If no corresponding registration request 15 was received for the previously used domain name 14, the process continues to step 406. In step 406, the previously used domain name 14 (or if applicable a new domain name 14) is deleted from the main registry server 106 and released in a manner that is standard in the art. In this way, previously registered domain names 14 and/or new domain names 14 are released from the main registry server 102 and thus fall under the control of the drop zone server 104, i.e. are included in the drop zone session as defined in the publication 16.

If a corresponding registration request 15 was received for the previously used domain name 14, the process continues to step 408. In step 408, the drop zone control module 108 retrieves the first received registration request 15 for the domain name 14. In step 410, the drop zone control module 108 determines whether or not the registrar 102 that submitted the registration request 15 has sufficient funds in its corresponding account to pay for the registration request 15.

If there are sufficient funds in the account, the drop zone control module 108 continues to step 412. In step 412, the drop zone control module 108 processes the registration request 15. That is, the registration information for the domain name 14 is deleted/updated and replaced with new registration information provided by the registrar 102, thus resulting in completing the purchase/acquisition (also referred to as assignment) of the domain name 14 to the registrar 102 (e.g. registrar 102*a* in FIG. 2). The registrar's 102 corresponding account with the main registry server 106 is charged for the registration of the domain name 14.

If, however, there are insufficient funds in the account, the drop zone control module 108 continues to step 414. In step 414, the drop zone control module 108 determines if there are any further registration requests 15 for the domain name 14 included in the publication 16.

If there are no further registration requests 15 for the domain name 14, the drop zone control module 108 continues to step 406 and the domain name 14 is released as described above. If, however, there are further registration requests 15 for the domain name 14, the drop zone control module 108 continues to step 416. In step 416, the drop zone control module 108 retrieves the next sequential registration request 15 from the drop zone server 104.

As previously described, in the present embodiment, the sequence in which the duplicate registration requests 15 are received by the drop zone server 104 is maintained. The drop zone control module 108 returns to step 410 to determine whether or not the registrar 102 that submitted the next sequential registration request 15 has sufficient funds in its corresponding account to pay for the registration request 15. This process is implemented for the domain names 14 listed in the daily (e.g. redemption hold period) report 16 for that particular day.

The registrar 102 is informed that the registration request 15 was successful via a daily result report. The daily result report lists the results following the completion of the distribution process described above. In the present embodiment, the daily result report is private to each registrar 102. After this point the registrar 102 can confirm the registration of the domain name 14 with the main registry server 106.

Accordingly, it will be appreciated that registration of (e.g. previously used) domain names 14 as described above improves the fairness in which the domain names 14 are distributed. Specifically, since the number of connections per registrar 102 can be significantly limited and a plurality of domain names 14 become available simultaneously, the registrars 102 have to prioritize the domain names 14 for which they will attempt to register. This feature increases the odds that previously used domain names 14 will be distributed more evenly amongst the registrars 102, as dictated by the systematic application of the window(s) 130 and the associated details 131.

Although the previous embodiment relates specifically to the distribution of previous used domain names 14, a person skilled in the art will appreciate that the invention need not be so limited. Rather, the same solution may be implemented to solve similar problems. That is, when there are a number of different bidders competing for limited resources the solution described above may be implemented.

For example, consider the case where the limited resources are newly released domain names 14. This may occur with the release of a new top-level domain 14 or with the release of previously withheld domain names 14 for an existing top-level domain 14. Such a release would result in a similar problem as the release of previously used domain names 14. Accordingly, the system and method described above could be implemented to facilitate distribution of these domain names 14.

Figure 6:
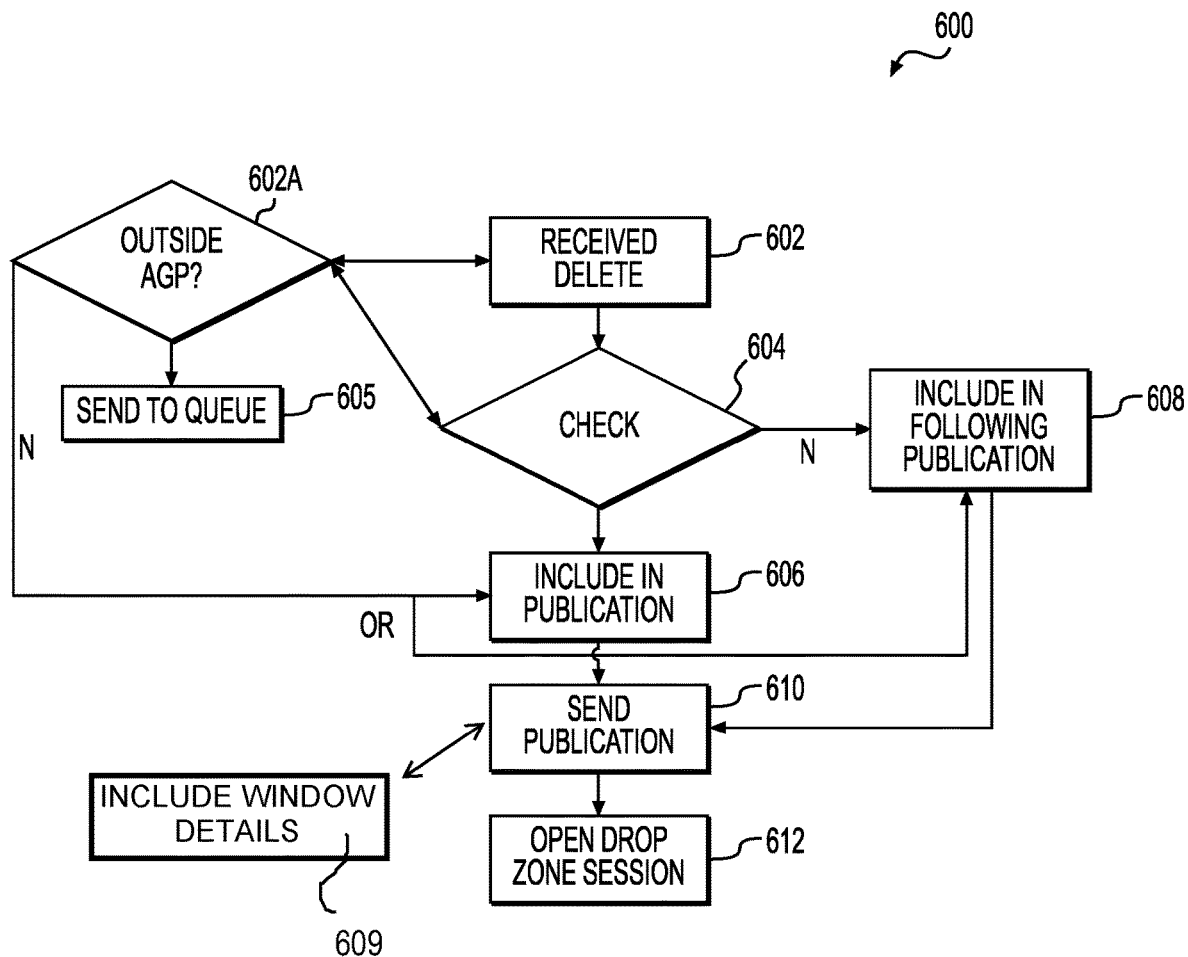
FIG. 6 is a flow chart illustrating an alternative embodiment of the registration fulfilment process of FIG. 2.

Referring to FIGS. 5 and 6, shown is an example operation of a management process 600 of the delete queue 501, including coordinating (e.g. via the main registry server 106) the utilization of multiple entry point(s) 500 of a domain name 14 to the drop zone server 104. For example, the entry point 500*a* is when the domain name 14 reaches the end point E of the delete queue 501 and is thus passed to the drop zone server 104. Alternatively, entry point 500*b* is where the domain name 14 is deleted during the AGP period and thus is passed to the drop zone server 104 in a path that bypasses the delete queue 501. It is recognised that depending upon the delete command 502*a,b,c* utilized by the drop zone infrastructure 100, the domain name 14 can enter via one or more different points P into the delete queue 501 (e.g. via the GP period at beginning point T or via the RGP period resulting from a delete command 502*a,c* generated by the registrar 102). In any event, it is recognised that the delete queue has a beginning point T and end point E, such that the domain name 14 can enter the delete queue 501 between or on the points T,E, as desired. Further, the GP period can be optional. Further, the RGP period can be optional or otherwise included as part of the RHP period, as desired.

At step 602, the main registry server 106 (or other server operating on behalf of the main registry server 106) receives the delete command 502*d* or determines that that the domain name 14 is at or near the end point E. Then, the server 106 checks 604 a cut off period, in order to determine if the domain name is eligible to be included in the next upcoming drop zone session administered by the drop zone 104. For example, the cut-off period/time could be 3 pm for the next day's drop zone session. If the delete command 502*d* was received before 3 pm or the domain name 14 is considered at or near the end point E before 3 pm, then the domain name 14 is included 606 in the publication 16 for the next day's drop zone session. If the delete command 502*d* was received after 3 pm or the domain name 14 is considered at or near the end point E after 3 pm, then the domain name 14 is not included in the publication 16 for the next day's drop zone session, rather the inclusion of the domain name 14 is scheduled 608 for the next publication 16 (e.g. associated with the following drop zone session). It is recognised that a drop zone session can include a plurality of windows 130 and their related details 131, as implemented via step 609.

At step 602, the server 106 receives the delete command 502*a,b,c,d* and checks 602*a*/compares a time ID/stamp (e.g. the receipt/generation time) of the delete command 502*a,b,c,d* against a domain create list 30 (see FIG. 1). For example, the domain create list can contain create dates for each of the domain names 14. If the time ID of the delete command 502*a,b,c,d* is outside of the AGP period (e.g. as measured from the create date of the domain name 14), then the server 106 considers the delete command as the post AGP <delete> command 502*c* and sends 605 the domain name 14 to the delete queue 501. Alternatively, if the time ID of the delete command 502*a,b,c,d* is inside of the AGP period (e.g. as measured from the create date of the domain name 14), then the server 106 considers the delete command as the pre AGP <delete> command 502*d* and sends the domain name 14 to be included in the next appropriate publication 16 and thus drop zone session (i.e. in a path that bypasses the delete queue 501). It is also recognised that the server 106 could also check 604 (at step 602*a*) whether the cut off period has been reached or not, thereby dictating whether to send to the include publication step 606 or to include in following publication step 608 (using similar logic as outlined in step 604 above), in the case where the time ID of the delete command 502*a,b,c,d* is inside of the AGP period.

At step 610, the publication 16 is sent to the registrars 102. At step 612, the next scheduled drop zone session opens (as dictated by the current publication 16) and then the registrars 102 can submit their registration requests 15, for consideration by the control module 108 as discussed above by example.

Figure 8:
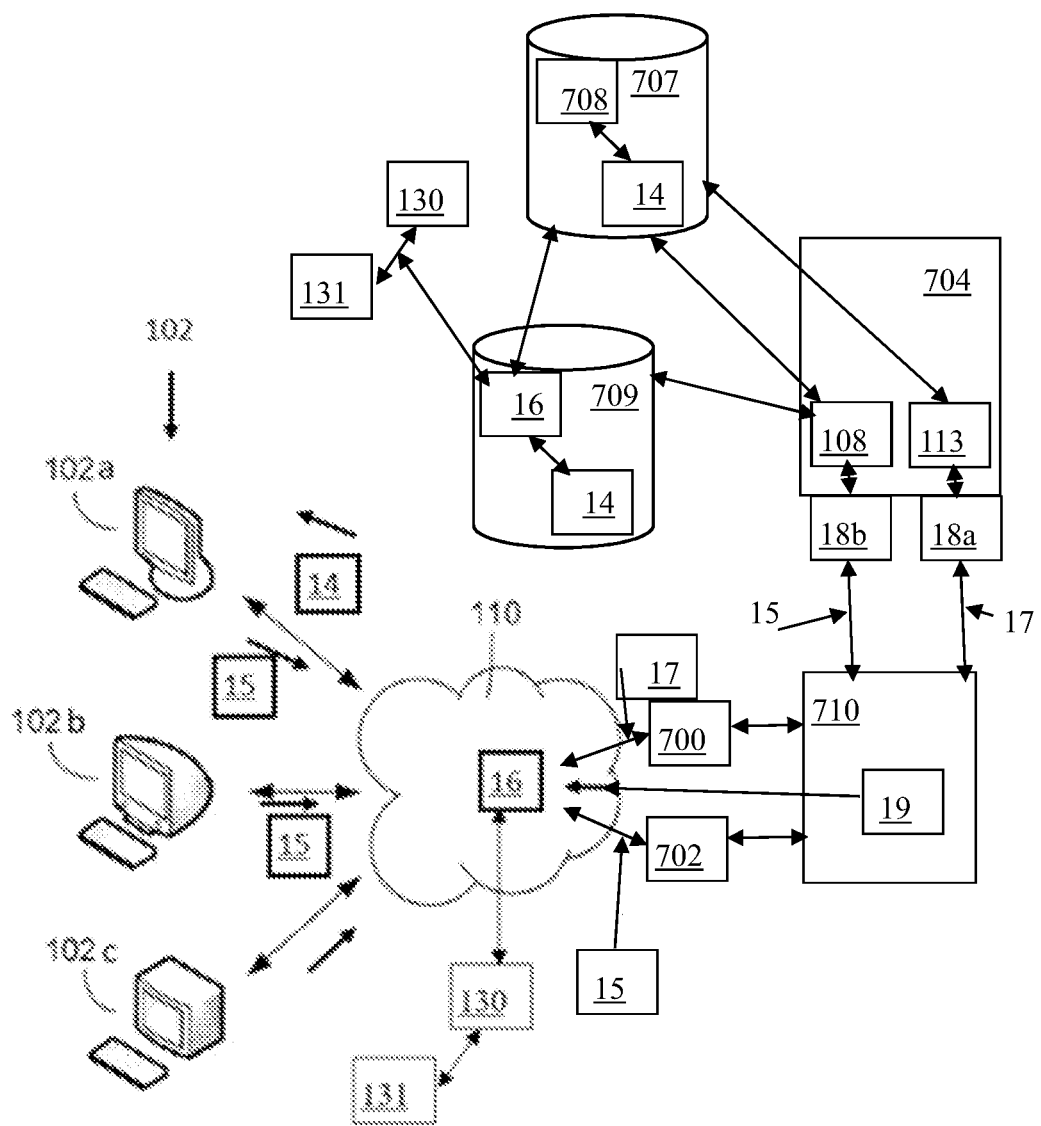

Referring to FIG. 8, shown is a further embodiment of the system of FIG. 1*a*, having a physically shared server 704 used to manage the registry database 707 containing registry data 708 (e.g. registrar objects, contact objects, name server objects, domain objects, as well as any other related date objects) for each of the domain names 14. The specification of the content and format of this registry data 708 can be such as but not limited to:

1. Registrar objects. The registrar object corresponds to a single registrar. It can include the following data:
   Registrar ID (conforming to the IANA registrar-ids registry)
   Contact ID of Registrar
   Registrar Administrative Contacts
   Registrar Technical Contacts
   Registrar Billing Contacts
   Registrar URL
   Registrar Creation Date
   Registrar Last Updated Date 2. Contact objects. The contact object corresponds to a single contact (whether registrant, administrative, technical or billing contact). The contact object includes the following data:
   Contact ID
   Contact Name
   Contact Organization
   Contact Address, City, State/Province, Country
   Contact Postal Code
   Contact Phone, Fax, E-mail 3. Nameserver objects. A nameserver object corresponds to a single registered nameserver. The nameserver object includes the following data:
   Name Server ID
   Name Server Host Name
   Name Server IP Addresses if applicable
   Current Registrar
   Name Server Creation Date
   Name Server Last Updated Date 4. Domain objects. The domain object corresponds to a single Registered Name. Each domain object includes the following data:
   Domain ID
   Domain Name
   Sponsoring Registrar
   Domain Status
   　All contact information (including all details) with at
   　　least one each of:
   　Registrant
   　Administrative
   　Technical
   　Billing
   All nameservers associated with this domain
   Domain Registration Date (e.g. Domain Registration Date object DRD)
   Domain Expiration Date (e.g. Domain Expiry Date object DED)
   Domain Last Updated Date Referring again to FIG. 8, also provided is an optional load balancer module 710 (e.g. a rate limiter) for balancing the network traffic load received/sent (e.g. communications 15, 16, 17) on one of a pair of network endpoints 700, 702. It is recognised that the server 704 receives (e.g. via the load balancer module 710) the network traffic via the endpoints 700,702. In this manner, the server 704 is implemented as a shared server instance (i.e. a provisioned server) for the pair of endpoints 700, 702. For example, a server instance can be defined as a single copy of the server software running on a single physical or virtual server 706 (e.g. physical server infrastructure as shown by example in FIG. 7). On the contrary, if one server executes two copies of the server software on the same physical or virtual server, that counts as two instances. A further described below, even though the server 704 shares the pair of endpoints 700, 702, each of the endpoints 700, 702 are used for different and distinct purposes. The load balancer module 710 can be used by the server 704 to load balance the requests 15,17 received from the network 110 on behalf of the server 704. As such, the load balancer module 710 can be used to direct the requests 15,17 to the appropriate network endpoint 700, 702, as received, as well as to direct the appropriate response 19 (e.g. approved registration based on the received registration request 15, confirmation of processing of an EPP command by the registry module 17 based on the received registry request 17, etc.).

It should be recognised that network endpoint 702 is used only for receiving and processing of acquisition requests 15 directed to the drop zone (e.g. the drop zone module 108), while the network endpoint 700 is used only for receiving and processing maintenance requests 17 for adding/modifying/deleting the contents of the registration data 708 stored in the registry database 707. In implementation of the drop zone acquisition process described, the drop zone module 108 can obtain information pertaining to the dropped domain names 14 directly from the main registry data base 707. Alternatively, in implementation of the drop zone acquisition process described, the drop zone module 108 can obtain information pertaining to the dropped domain names 14 directly from separate drop zone data base 709. For example, the domain name 14 and associated acquisition parameters 131 of the drop zone session are stored in the drop zone database 709 that is separate from the main registry database 707, in order to inhibit unwanted numbers of requests directed to the main registry database 707 during the drop zone session.

In this manner, each of the network endpoints 700, 702 will have separate and distinct connectivity policies 18a, 18b. In this manner, even though the server 704 instance is shared between the pair of network endpoints 700, 702, the drop zone control module 108 controls the distribution of requested domain names 14 in accordance with available domain names 14 and registration requests 15 submitted to the drop zone servers 104, via the network endpoint 702, as described. Accordingly, it will be appreciated that a main registry serves module 113 can be used primarily for tasks such as maintaining the registry data 708 and for example servicing DNS resolution queries. Connectivity to the drop zone network endpoint 702 can be highly limited and equivalent between registrars 102. For example, each registrar 102 can be limited to three connections to the drop zone network endpoint 702. This affords scalability and the ability to maintain separate connectivity policy 18a for the drop zone network endpoint 702 and connectivity policy 18b for the main registry network endpoint 700. The connectivity policy 18a can be used to define the number of connections allowed at one time between a particular registrar 102 and the respective main registry network endpoint 700. Accordingly, an excess number of connection requests from a particular registrar 102 would be inhibited (e.g. not allowed) via the main registry network endpoint 700, thus any such excess connection requests 17 received by the main server module 113 would not be processed (e.g. an error message would be returned to the registrar 102 upon receipt by the main server module 113 of such a restricted excess connection—e.g. number of connections with a particular registrar 102 greater than a defined number). The connectivity policy 18a can be used to define the type of network 110 communication/command/request allowed between a particular registrar 102 and the respective server module 113, e.g. set up an account with the main registry, and other EPP commands such as Delete domain, Renew domain, etc. The connectivity policy 18a could also restrict (e.g. not allow) command types such as Domain Create pertaining to purchase/acquisition of the domain names 14 made available via the publication 16. Accordingly, for example such as Domain Create, this command would be inhibited (e.g. not allowed) to be submitted from the registrars 102 to the main registry network endpoint 700, thus any such restricted commands received by the main registry network endpoint 700 would not be processed (e.g. an error message would be returned to the registrar 102 upon receipt by the main server module 113 of such a restricted command type).

On the contrary, the connectivity policy 18b can be used to define the number of connections allowed at one time between a particular registrar 102 and the respective drop zone network endpoint 702, such that the number of connections for the drop zone network endpoint 702 can be different from the number of connections for the main registry network endpoint 700. The connectivity policy 18b can be used to limit the type of network 110 communication 15 allowed between a particular registrar 102 and the respective drop zone network endpoint 702, e.g. EPP commands such as Domain Create, Hello, and Login pertaining to purchase/acquisition of the domain names 14 made available via the publication 16. Accordingly, other commands, such as Delete Domain, would be inhibited (e.g. not allowed) to be submitted from the registrars 102 to the drop zone network endpoint 702, thus any such restricted commands received by the drop zone network endpoint 702 would not be processed by the main registry module 113 (e.g. an error message would be returned to the registrar 102 upon receipt by the drop zone network endpoint 702 of such a restricted command type). In this manner, the pair of network endpoints 700, 702 are provided using separate connectivity policies 18a,18b, as processed by a shared server instance 704 (e.g. using the drop zone module 108 to process requests 15 and the registry module 113 to proves the requests 17).

As an example implementation, each of the endpoints 700, 702 can be defined as a distinct network socket (e.g. a software structure) within a network node (i.e. server 704 and optional associated load balancer 110) of a computer network 110, which serves as different endpoints for sending and receiving data (e.g. respective request/response communications 15,17) across the network 110. The structure and properties of a socket can be defined by an application programming interface (API) for the networking architecture. For example, sockets could be created only during the lifetime of a process of an application running in the node. At the time of creation with the API, a network socket can be bound to the combination of a type of network protocol to be used for transmissions (15 or 17), a network address of the host (e.g. the server 704 and optionally associated load balancer 110), and a distinct port number. Ports can be numbered resources that represent another type of software structure of the node 704. Ports can be used as service types, and, once created by a process, serve as an externally (from the network 110) addressable location component, so that other hosts 102 can establish connections with the server 704. The term port can be used for external physical endpoints at a node or device. In the standard Internet protocols TCP and UDP, a socket address can be referred to as the combination of an IP address and a port number. In one example, a socket can refer to an internet socket or TCP socket. An internet socket is minimally characterized by the following: local socket address, consisting of the local IP address and (for TCP and UDP, but not IP) a port number protocol: and a transport protocol, e.g., TCP, UDP, raw IP. This can mean that (local or remote) endpoints with TCP port 53 and UDP port 53 are distinct sockets, while IP does not have ports. A socket that has been connected to another socket, e.g., during the establishment of a TCP connection, also has a remote socket address. A port number is always associated with an IP address of a host and the type of transport protocol used for communication. It completes the destination or origination network address of a message. Specific port numbers are reserved to identify specific services so that an arriving packet can be easily forwarded to a running application.

In view of the above, preferably the endpoints 700, 702 would each have their own separate port, as implemented via the server 704. As such, in using the separate endpoints 700, 702, importantly the drop zone process implemented by the drop zone module 108 (of the server 70,) is segregated from other functionality of the registry 704 (e.g. as implemented by the registry module 113). As such, it is recognised that logically the different endpoints 700, 702 would have different network 110 addresses (e.g. IP addresses) and each network endpoint 700, 702 would be regulated by its own respective connectivity policy 18a, 18b (i.e. endpoint 700 is regulated using connectivity policy 18a and endpoint 702 is regulated using connectivity policy 18b).

Figure 7:
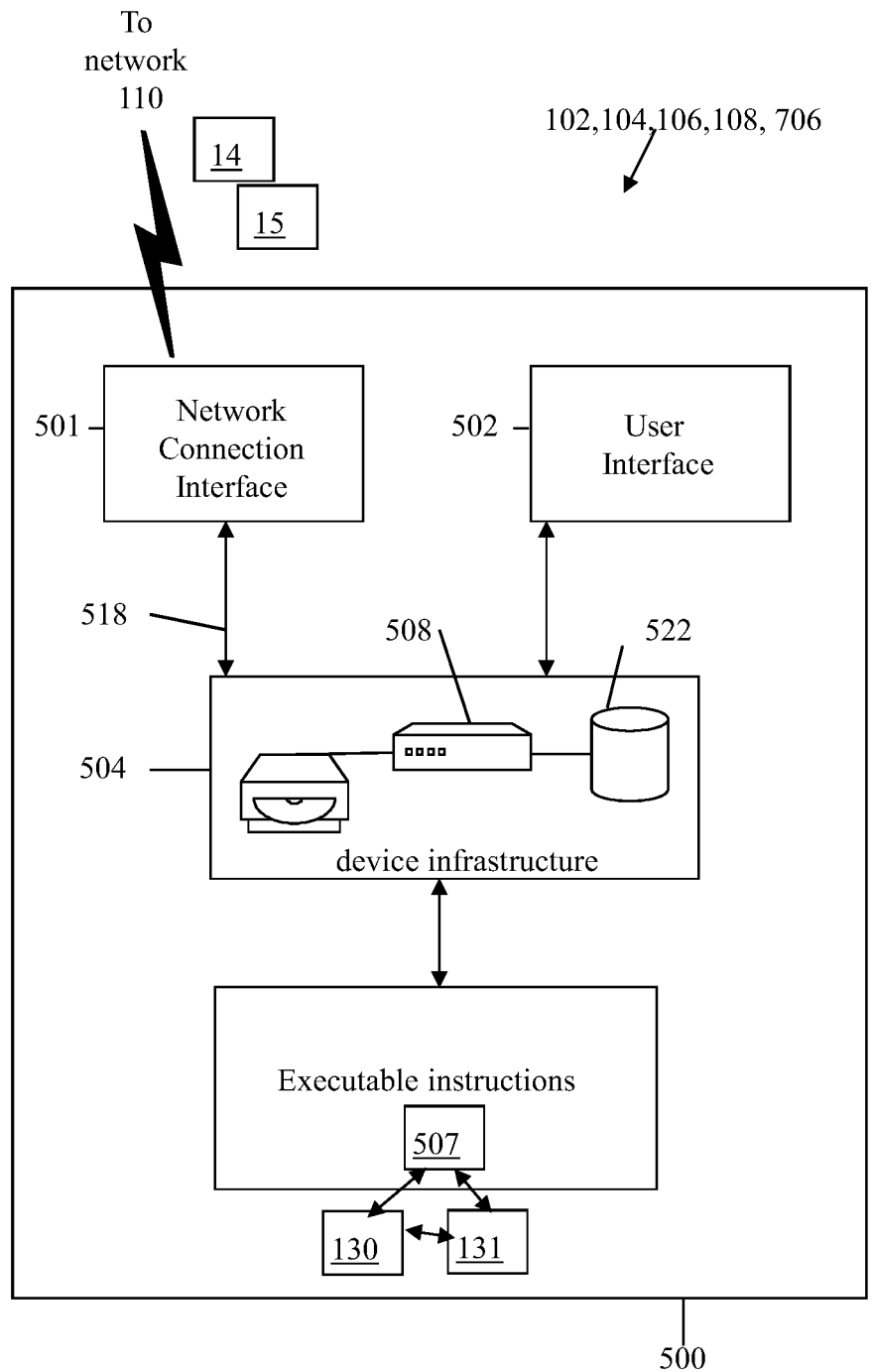
FIG. 7 is an example embodiment of the servers of the drop zone infrastructure of FIG. 1.

Referring to FIG. 7, shown is such that operation of the device 500 (as implemented by any of the registrar 102, drop zone server 104, main registry server 106, shared instance server 704, and/or control module 108) is facilitated by the device infrastructure 504. The device infrastructure 504 includes one or more computer processors 508 and can include an associated memory 522. The computer processor 508 facilitates performance of the device 500 configured for the intended task (e.g. of the respective operation of any of the servers 102,104,106, 108 as described) through operation of the network interface 501, the user interface 502 and other application programs/hardware of the device 500 by executing task related instructions. These task related instructions (e.g. contents of the publication 16 and associated windows 130 and details 131 as defined) can be provided by an operating system, and/or software applications located in the memory 522, and/or by operability that is configured into the electronic/digital circuitry of the processor(s) 508 designed to perform the specific task(s). Further, it is recognized that the device infrastructure 504 can include a computer readable storage medium coupled to the processor 508 for providing instructions to the processor 508 and/or to load/update the instructions 507. The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

It is recognised that when the device 500 is utilized to execute the shared server instance 704, the device infrastructure 504 of the computer readable storage medium coupled to the processor 508 (for providing instructions to the processor 508 and/or to load/update the instructions 507) would be used as shared physical computer resources by the different modules 108, 113 to process the received requests 15, 17.

Further, it is recognized that the computing device 500 can include the executable applications comprising code or machine readable instructions 507 for implementing predetermined functions/operations including those of an operating system and the modules, for example. The processor 508 as used herein is a configured device and/or set of machine-readable instructions for performing operations as described by example above, including those operations as performed by any or all of the modules. As used herein, the processor 508 may comprise any one or combination of, hardware, firmware, and/or software. The processor 508 acts upon information by manipulating, analyzing, modifying, converting or transmitting information for use by an executable procedure or an information device, and/or by routing the information with respect to an output device. The processor 508 may use or comprise the capabilities of a controller or microprocessor, for example. Accordingly, any of the functionality of the modules may be implemented in hardware, software or a combination of both. Accordingly, the use of a processor 508 as a device and/or as a set of machine-readable instructions is hereafter referred to generically as a processor/module 508 for sake of simplicity.

It will be understood in view of the above that the computing devices 500 may be, although depicted as a single computer system, may be implemented as a network of computer processors, as desired. In any event, it is recognised that the computer device 500 as shown can be envisioned as provisioned as a registrar 102 connected to the network 110. Alternatively, it is recognised that the computer device 500 as shown can be envisioned as provisioned as drop zone server 104 connected to the network 110. Alternatively, it is recognised that the computer device 500 as shown can be envisioned as provisioned as main registry server 106 connected to the network 110. Alternatively, it is recognised that the computer device 500 as shown can be envisioned as provisioned as control module 108 connected to the network 110. Alternatively, it is recognised that the computer device 500 as shown can be envisioned as provisioned as the shared server instance 704 (implementing the functionality of the control module 108 and the main registry module 113) connected to the network 110.

As another example, consider the case when the limited resources are auction items rather than previously used domain names 14. The drop zone server 104 can open to bids on all items for which the auction is expiring during a given time period. Similarly to the embodiment described above, bidders would have to prioritize their bid, rather than being able to focus on each auction item. This, in turn, increases the likelihood that more bidders will be successful in at least one bid.

Although the invention has been described with reference to certain specific embodiments, various modifications thereof will be apparent to those skilled in the art without departing from the scope of the invention as defined by the appended claims.

The invention claimed is:

1. A server for distributing a domain name to one of a plurality of registrars using a drop zone session implemented via a communications network, the server having stored instructions for execution by a computer processor for:

receiving the domain name from a registration server using a network path based on a time ID of a delete command of the domain name, such that the network path is either a first path originating from a delete queue storing the domain name or a second path which bypasses the delete queue, the delete queue configured for storing domain names deposited in the delete queue in response to one or more delete commands;

administering the drop zone session by establishing a set of drop zone windows having a first window and a second window, a defined start time of the second window being subsequent to a defined end time of the first window, the first window having a first set of acquisition parameters and the second window having a second set of acquisition parameters, such that the first set of acquisition parameters are different from the second set of acquisition parameters, each of the first window and the second window being defined as having a start time and an end time and each of the first window and the second window having one or more listed domain names available for registration by the one of the plurality of registrars between the start time and the end time, the domain name included in the one or more listed domain names;

assigning the domain name to the first window with the associated first set of acquisition parameters;

determining the domain name remains unacquired upon reaching the end time of the first window;

assigning the domain name to the second window with the associated second set of acquisition parameters;

receiving a registration request via the communications network from a registrar for the domain name before a defined end time of the second window;

processing the registration request using the second set of acquisition parameters; and registering the domain name in a registry database as acquired by the registrar.

2. The server of claim 1, wherein the first set of acquisition parameters has a first purchase price parameter and the second set of acquisition parameters has a second purchase price parameter, such that the first price parameter is greater than the second price parameter.

3. The server of claim 1 further comprising a publication sent over the communications network for receipt by a plurality of registrars, the publication including a plurality of domain names and information about the set of drop zone windows as the drop zone session, the information including the defined start time of the second window and the defined end time of the first window, the plurality of domains including the domain name.

4. The server of claim 1, wherein the first set of acquisition parameters includes specified domain types for a plurality of domains including the domain name such that each domain type of the plurality of domain types has a different assigned pricing.

5. The server of claim 1, wherein the establishing the set of drop zone windows contains more windows than the first window and the second window.

6. The server of claim 1, wherein the first window is a current window and the second window is a subsequent window, such that either the first window or the second window is available at any one time during the drop zone session for use by the registrar.

7. The server of claim 1, wherein the second window is administered by a drop zone module of the server implementing the drop zone process of the drop zone session, such that when in the second window the domain name is considered inside of the drop zone session detailed in a publication containing at least some of the second set of acquisition parameters.

8. The server of claim 1, wherein the second window is administered by a registry module of the registry server, such that when in the second window the domain name is considered outside of the drop zone process of the drop zone session administered by the server as detailed in a publication containing at least some of the first set of acquisition parameters.

9. The server of claim 1 further comprising selecting another the domain name as a new domain name for registration via the drop zone session.

10. The server of claim 1 further comprising selecting the domain name from outside of the delete queue for subsequent registration via the drop zone session based on the time ID being inside of an add grace period AGP and based on checking whether the delete command is within a cut off period.

11. A shared server implementing a shared server instance as a single copy of server software for distributing a domain name to one of a plurality of registrars using a drop zone session for coordinating registration of the domain name as a registration period in response to registration requests and for processing maintenance requests, the shared server having:

a first network endpoint connected to a communications network, the first network endpoint having a first connectivity policy defining a first purpose of processing the maintenance requests;

a second network endpoint connected to the communications network, the second network endpoint having a second connectivity policy defining a second purpose of processing the registration requests, such that the first connectivity policy is different from the second connectivity policy, each of the first connectivity policy and the second connectivity policy defining a respective number of network connections allowed using their respective network endpoint;

a computer processor and memory shared for processing requests received on any of the first network endpoint and the second network endpoint, the memory having stored instructions for execution by the computer processor for:

using the second network endpoint to receive and process by the shared server instance the registration request of the registration requests associated with a drop zone session only when the respective number of network connections with said one of the plurality of registrars is not exceeded; and using the first network endpoint to receive one or more registry requests other than said registration requests including the maintenance requests;

wherein any of said registration requests received on the first network endpoint are refused by the shared server instance while the maintenance requests received in the first network endpoint are processed by the shared server instance.

12. The shared server of claim 11 further comprising the stored instructions to include generating a publication to include the domain name as available for an upcoming drop zone session and sending the publication to a plurality of registrars.

13. The shared server of claim 11, wherein said registration requests are received from the plurality of registrars.

14. The shared server of claim 11, wherein the second network endpoint is associated with a drop zone module implementing the drop zone session, such that drop zone module processes the one or more of said registration requests received on the second network endpoint, the drop zone session including a start time and an end time and having one or more listed domain names available for said registration by the one of the plurality of registrars between the start time and the end time, the domain name included in the one or more listed domain names.

15. The shared server of claim 14, wherein the domain name and associated acquisition parameters of the drop zone session are stored in a drop zone database that is separate from a main registry database.

16. The shared server of claim 11, wherein the first network endpoint is associated with a registry module implementing registry functions other than the drop zone session, such that registry module processes the one or more registry requests other than said registration requests received on the first network endpoint, the drop zone session including a start time and an end time and having one or more listed domain names available for said registration by the one of the plurality of registrars between the start time and the end time, the domain name included in the one or more listed domain names.

17. The shared server of claim 11 further comprising the shared server coupled over the communications network to a load balancer module, the load balancer module used to load balance the registration requests and the one or more registry requests other than said registration requests received from the communications network on behalf of the shared server, such that the load balancer module distributes the one or more registry requests to the appropriate network endpoint as well as to direct the appropriate response.

18. The shared server of claim 11, wherein the first connectivity policy includes a restricted command type of the one or more registry requests, the restricted command type is one of a plurality of different command types such that the restricted command type is not processed by the shared server and instead an error message is generated.

19. The shared server of claim 11, wherein the second connectivity policy includes a restricted command type of the registration requests, the restricted command type is one of a plurality of different command types such that the restricted command type is not processed by the shared server and instead an error message is generated.

* * * * *